Oct. 10, 1967   G. W. ENK   3,346,779
ELECTRICAL TIMING APPARATUS
Filed May 17, 1963
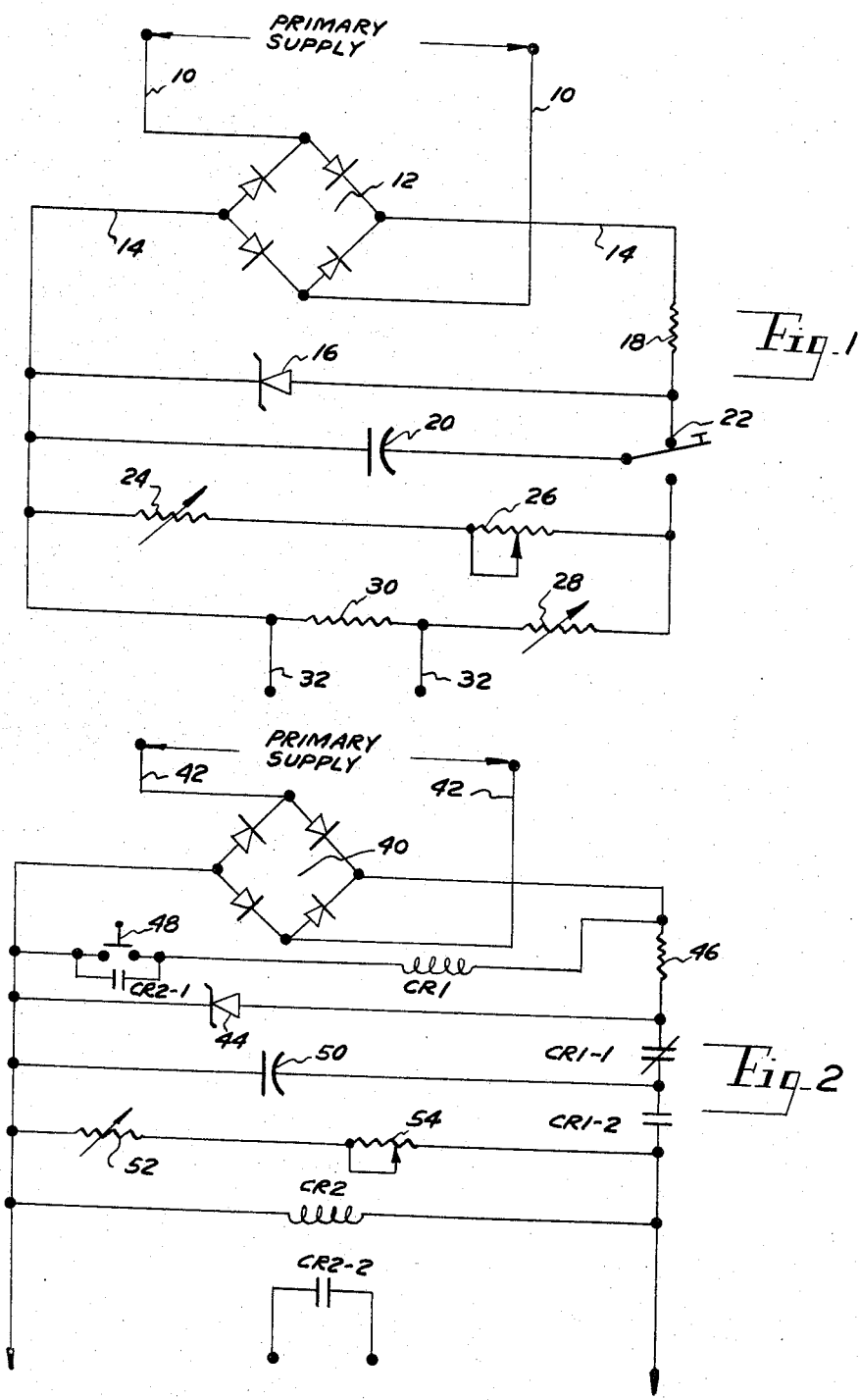
INVENTOR.
GEORGE W. ENK
BY
ATTORNEY

United States Patent Office 3,346,779
Patented Oct. 10, 1967

3,346,779
ELECTRICAL TIMING APPARATUS
George W. Enk, 2635 Hyland, Ferndale, Mich. 48220
Filed May 17, 1963, Ser. No. 281,296
2 Claims. (Cl. 317—141)

This invention relates to electrical apparatus for measuring intervals of time and more particularly to such apparatus which provides an electrical output signal as a predetermined time interval after the occurrence of an event.

It is often desirable that certain equipment be operative for a predetermined time interval after the occurrence of a reference event, such as the closing of a switch, or that a device be actuated at a predetermined time after the occurrence of the reference event. For example, the cycle of an automatic resistance welder includes a period measured in microseconds during which a weld current is applied to the electrodes. The commencement of the weld period may be signaled by the closing of a limit switch which indicates that the electrodes are in contact with a workpiece, and at the end of a predetermined time interval current is shut off and the electrodes separate from the work. Such electrical timers normally operate upon the principle that a voltage storage device such as a capacitor will charge up at a fixed rate from an electrical power source. At the beginning of a time cycle, power is applied to the capacitor through a known resistance and when the voltage across the capacitor reaches a predetermined level, a voltage sensitive device such as a relay is actuated. Such timing devices are dependent upon the provision of a constant and continuous power supply for proper operation. The primary power supply for such circuits normally constitutes an electrical service line which is connected to a number of loads and which may power other devices in the equipment which employs the timer. The introduction and removal of loads from the line will often affect the voltage of the power supply so as to vary the time required for the capacitor to reach a predetermined voltage level. For example, if such a timer is employed to control welding currents, the welding current drain on the line will lower the line voltage so as to adversely affect the operation of the timing circuit. The use of a regulated voltage source which converts the voltage of the power line to a lower constant value assists in the generation of exact time intervals from such equipment, but does not provide a solution when the line voltage falls below the regulator level as may happen when a short occurs across the line. The improper operation of timers can lead to the destruction of expensive equipment, as in the case of a welding unit which may burn out if the time interval of use is excessive.

The present invention therefore contemplates an electric timer circuit which generates a precision time interval after the occurrence of a reference event independently of variations in the units' primary power supply. Units formed in accordance with the present invention will provide accurate time intervals even through the primary power source may become short-circuited or decrease to a very low value during the timing interval.

In a preferred embodiment of the invention, which will subsequently be described in detail, the primary power source charges a capacitor through a regulated power supply. The power supply is designed to provide the capacitor with a regulated voltage substantially below the normal line value. In this manner the voltage level of the capacitor is maintained at a constant value. Upon the occurrence of the reference event the capacitor is disconnected from the regulated power supply so that variations in the power supply below the regulated voltage value will not affect its charge, and is connected to a calibrated resistance discharge network. A voltage sensitive device, such as a relay, shunted across the resistance discharge circuit, is actuated at the instant the capacitor is connected thereto and remains actuated until the voltage across the resistance falls below a threshhold value. Since the charge on the capactior and the value of the resistance is constant during this operation and it is not affected by variations in the primary power source, the time interval thus produced is highly reliable.

One of the embodiments employs a unique relay lockout circuit designed so as to prevent an accidental repeating of the timing cycle in the absence of the occurrence of the reference event. The relay acts so that any malfunction which occurs during one cycle will lock out further operation of the timer.

It is therefore seen to be an object of the present invention to provide an electrical timing circuit which operates from a secondary power supply which is charged from a primary power supply prior to the timing interval, and disconnected from the primary power supply during the timing interval.

Another object is to provide a timing unit wherein an interval is measured by the time of discharge of a capacitor into a resistance and the capacitor is charged by a power supply prior to the timing interval and is disconnected from its charge source during the interval.

Another object is to provide electrical timing circuit which operates upon the discharge of a stored voltage into a resistance so that any shorts in the equipment will decrease the timing interval rather than lengthen it.

Other objects, advantages and applications of the present invention will be made apparent by the following detailed descriptions of two preferred embodiments of the invention. The descriptions make reference to the accompanying drawings in which:

FIGURE 1 is an electric timing unit which provides a voltage as its output signal; and FIGURE 2 is a schematic representation of an electric timing circuit which may form part of a more complex control circuit.

The circuit of FIGURE 1 is connected to a primary power supply by a pair of lines 10. The primary supply may be either alternating current or direct current. Normally it will be the commercial electrical service of a building, but might also constitute a battery supply. In the preferred embodiment the supply will be a 117 volt AC service. As is well known, the voltages of such circuits may fall to substantially lower levels if the line is heavily loaded and may sharply decrease if the line becomes shorted.

The lines 10 connect to input points of a bridge rectifier circuit 12. The rectifiers preferably are solid state devices of the silicon or selenium variety. They act in a well known manner to convert the alternating current from the primary supply into a pulsating direct current which is provided on the two output lines of the bridge 14. These lines 14 are shunted by a series combination of a Zener diode 16 and a resistor 18.

The Zener diode becomes conductive when the voltage across it exceeds a threshold value, in the case of the preferred embodiment 56 volts. It thereby acts as a voltage regulating device and as long as the voltage across the primary source exceeds 56 volts that voltage will appear across the Zener diode. The resistor 18 acts to limit the current passing through the Zener diode 16. The breakover value of the Zener diode is chosen so as to be below the lowest voltage which may ever be expected to appear across the line in normal operation.

A capacitor 20 is normally connected across the Zener diode 16 by a single pole double-throw switch 22. The capacitor is thereby charged to the breakover voltage of the diode 16.

When the switch 22 is actuated from its normal position the capacitor 20 is disconnected from the Zener diode 16 and is shunted across a resistance discharge circuit which comprises the series combination of a calibration resistor 24 and a timing potentiometer 26. The calibration resistor is variable and is utilized to trim the operation of the circuit to particular points on the scale setting of the timing potentiometer. That is, after the timing potentiometer's scale has been adjusted by the calibration resistor, the timing potentiometer is normally employed to vary the timing operation of the device.

The series combination of the calibration resistor and the timing potentiometer are in turn shunted by the series combination of another variable resistor 28 and an output resistor 30. A pair of lines 32 connect the output resistor to some voltage sensitive device which is to be actuated by the circuit. The variable resistor 28 acts with the resistor 30 as a voltage divider to adjust the portion of the voltage of the capacitor 20 which appears across the resistor 30 and is thereby provided to the voltage sensitive device.

In operation the switch 22 is normally in the position shown and the capacitor 20 is charged from the primary source by the regulated D.C. supply comprising the bridge circuit 12 of the resistor 18 and the Zener diode 16. When the switch 22 is actuated the capacitor 20 is disconnected from the primary supply and any further variations in the supply do not in any way affect the operation of the timer. The voltage of the capacitor 20 now appears across the voltage divider constituting the output resistor 30 and the variable resistor 28. The voltage supplied by the lines 32 to a voltage sensitive device will at this point be sufficient to actuate the device. The voltage 20 now begins to decay through the resistance networks shunting it. After a predetermined time interval the voltage across the output resistor 30 will fall below the level sufficient to actuate a voltage sensitive device and this will mark the termination of the timing interval initiated by the actuation of the switch 22.

The circuitry of FIGURE 2 is adapted to form part of a larger control circuit. In operation it is similar to the circuit of FIGURE 1. Again, a bridge rectifier 40 is connected to a primary supply to the lines 42. A Zener diode 44 which has a breakover value substantially below the line voltage is connected to the output of the bridge 40 through a current limiting resistor 46. The output of the bridge is also shunted by the coil of a relay CR1 and a normally open, manually actuated, push button 48. A normally closed contact of the relay, CR1–1 connects a capacitor 50 across the Zener diode 44. A normally open contact, CR1–2, connects the capacitor 50 to its discharge circuit consisting of a calibration resistor 52 and a timing potentiometer 54. The capacitor is also shunted by the coil of a relay CR2. A pair of normally open contacts, CR2–1 shunt the push button 48 and act as holding contacts for its circuit. The relay CR2 has another pair of contacts CR2–2 which may be either normally open or normally closed, and are useful in the associated circuitry.

While the push button is open, capacitor 50 is charged by the voltage regulating system constituting the bridge rectifier 40, the resistor 46 and the Zener diode 44 through a normally closed contact CR1–1. When the push button 48 is actuated to indicate the commencement of a timing cycle, contact CR1–1 opens, disconnecting the capacitor 50 from the primary power supply, and the contact CR1–2 closes, connecting the capacitor 50 to its circuit and to the relay coil CR2. Relay CR2 is immediately energized locking in its contact CR2–1 and thereby shunting the push button 48 which may now be released. It also closes its contact CR2–2 and energizes associated circuitry. This circuitry may be of such a nature as to draw heavily from the primary power supply so as to lower its voltage, but since the capacitor 50 is independent of the primary power supply at this point, the timing interval will remain precise.

When the voltage of the capacitor 50 has decreased below the point sufficient to energize the relay CR2, the timing interval will terminate and the contacts CR2–1 will open, deenergizing the relay CR1 and returning the circuit to its non-timing position. Simultaneously, the operating device actuated by the relay contacts CR2–2 will be deactuated.

Having thus described my invention, I claim:

1. A timing circuit operative to be powered from a primary alternating current electrical supply comprising: a voltage breakover rectifier device set to break over at a lower voltage than will normally be produced by said primary electrical supply; a rectifier circuit connecting said breakover rectifier device to the primary electrical supply; a capacitor; a single pole double throw switch having its common terminal connected to the capacitor and having the first of its other terminals connected to one side of the breakover rectifier device; a connection between the other side of the capacitor and the other side of the breakover rectifier device whereby when said single pole double throw switch is connected to the terminal joining said rectifier device, said capacitor is shunted across said breakover device; a variable resistance discharge path for said capacitor having one end connected to the capacitor and the other end connected to the second terminal of the single pole double throw switch whereby, when said single pole double throw switch is connected to its second terminal the capacitor is discharged through the variable resistance discharge circuit; and means for sensing the passage of current through said discharge circuit, whereby when said switch is connected to the first terminal, the capacitor is charged to the voltage of the breakover rectifier device, and when said switch is thrown to the position wherein it contacts the second terminal, the voltage of the capacitor is dissipated through the discharge circuit producing output from said means for detecting the passage of current through the discharge circuit for a predetermined time.

2. A timing circuit operative to be powered from a primary electrical supply comprising: a voltage breakover rectifier device shunted across said primary supply set to break over at a lower voltage than will normally be produced by said primary electrical supply; a first relay having first normally closed contacts and second normally open contacts; a momentary contact switch disposed in series with the coil of the first relay across said primary electrical supply; a capacitor disposed in series with the normally closed contacts of said first relay across said primary electrical supply; a voltage discharge circuit disposed in series with the normally open contacts of said first relay across said capacitor; and a second relay having a set of normally open contacts shunting the momentary contact switch, the coil of said second relay being disposed across said voltage discharge path, whereby when said momentary contact switch is closed, the coil of the first relay is energized, disconnecting the capacitor from the primary electrical supply and connecting it to the discharge path and the coil of the second relay, thereby locking in the coil of the first relay, until such time as the voltage of the capacitor has fallen below a level suitable for maintaining a coil of the second relay in an energized state.

References Cited

UNITED STATES PATENTS

| | | | |
|---|---|---|---|
| 2,645,744 | 7/1953 | Cassidy | 317—137 |
| 2,678,411 | 5/1954 | Hufnagel | 317—151 X |
| 2,942,123 | 6/1960 | Schuh | 317—148.5 |
| 2,981,898 | 4/1961 | St. John | 317—148.5 X |

MILTON O. HIRSHFIELD, *Primary Examiner.*

SAMUEL BERSTEIN, *Examiner.*

D. J. YUSKO, J. A. SILVERMAN, *Assistant Examiners.*